(12) United States Patent
Venkatraman

(10) Patent No.: US 8,209,431 B1
(45) Date of Patent: *Jun. 26, 2012

(54) SYSTEM AND METHOD FOR IMPROVING QUALITY OF SERVICE FOR WIRELESS LANS

(75) Inventor: Mahesh Venkatraman, Menlo Park, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/205,159

(22) Filed: Aug. 8, 2011

Related U.S. Application Data

(63) Continuation of application No. 11/390,704, filed on Mar. 28, 2006, now Pat. No. 7,996,554.

(60) Provisional application No. 60/738,267, filed on Nov. 18, 2005.

(51) Int. Cl.
*G06F 15/16* (2006.01)

(52) U.S. Cl. ........................................ 709/232

(58) Field of Classification Search .............. 709/232
See application file for complete search history.

(56) References Cited

U.S. PATENT DOCUMENTS

| | | | |
|---|---|---|---|
| 7,006,472 B1 | 2/2006 | Immonen et al. | |
| 7,068,633 B1 | 6/2006 | Ho | |
| 7,272,119 B2 | 9/2007 | Rudnick et al. | |
| 7,330,472 B2 | 2/2008 | Kowalski | |
| 7,355,998 B2 | 4/2008 | Briancon et al. | |
| 7,400,576 B2 | 7/2008 | Mori et al. | |
| 7,675,890 B2 | 3/2010 | Wang | |
| 7,701,912 B2 | 4/2010 | Thompson et al. | |
| 7,996,554 B1 * | 8/2011 | Venkatraman | 709/232 |
| 2003/0081583 A1 | 5/2003 | Kowalski | |
| 2004/0078566 A1 | 4/2004 | Barber et al. | |
| 2004/0095914 A1 | 5/2004 | Katsube et al. | |
| 2004/0097236 A1 | 5/2004 | Knox et al. | |
| 2004/0106403 A1 | 6/2004 | Mori et al. | |
| 2004/0214572 A1 | 10/2004 | Thompson et al. | |
| 2006/0165103 A1 | 7/2006 | Trudeau et al. | |
| 2007/0206527 A1 | 9/2007 | Lo et al. | |

OTHER PUBLICATIONS

IEEE P802.11g/D8.2, Apr. 2003 (Supplement to ANSI/IEEE Std 802.11-1999 (Reaff 2003)); Draft Supplement to Standard [for] Information Technology—Telecommunications and information exchange between systems—Local and metropolitan area networks—Specific requirements—Part11: Wireless LAN Medium Access Control (MAC) and Physical Layer (PHY) specification: Further Higher Data Rate Extension in the 2.4 GHz Band; LAN/MAN Standards Committee of the IEEE Computer Society; 69 pages.

802.11n; IEEE P802.11-04/0889r6; Wireless LANs, TGn Sync Proposal Technical Specification; 131 pages.

(Continued)

*Primary Examiner* — George C Neurauter

(57) ABSTRACT

An access point (AP) includes a control module that defines N basic service set identifiers (BSSID's) each corresponding to a class of service and having M service parameters, where N and M are integers greater than one. The AP includes an AP scheduling module that schedules communication between the AP and a plurality of client stations based on the N BSSID's and that determines a quality of service for the communication based on the N BSSID's and the M service parameters.

20 Claims, 14 Drawing Sheets

OTHER PUBLICATIONS

IEEE Std 802.11a-1999 (Supplement to IEEE Std 802.11-1999) [Adopted by ISO/IEC and redesignated as ISO/IEC 8802-11: 1999/Amd 1:2000(E)]; Supplement to IEEE Standard for Information technology—Telecommunications and information exchange between systems—Local and metropolitan area networks—Specific requirements—Part 11: Wirelss LAN Medium Access Control (MAC) and Physical Layer (PHY) specifications High-speed Physical Layer in the 5 GHz Band; LAN/MAN Standards Committee of the IEEE Computer Society; 91 pages.

IEEE Std 802.11b-1999 (Supplement to IEEE Std 802.11-1999 Edition); Supplement to IEEE Standard for Information technology—Telecommunications and information exchange between systems—Local and metropolitan area networks—Specific requirements—Part11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 15, 1999 IEEE-SA Standards Board; 96 pages.

IEEE 802.20-PD-06, IEEE P 802.20 V14, Jul. 16, 2004, Draft 802.20 Permanent Document, System Requirements for IEEE 802.20 Mobile Broadband Wireless Access Systems—Version 14, 24 pages.

IEEE Std 802.16/2004 (Revision of IEEE Std 802.16/2001) IEEE Standard for Local and metropolitan area networks; Part 16: Air Interface for Fixed Broadband Wireless Access Systems; IEEE Computer Society and the IEEE Microwave Theory and Techniquest Society; Oct. 1, 2004; 893 pages.

ANSI/IEEE Std 802.11m 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; 528 pages.

* cited by examiner

SYSTEM AND METHOD FOR IMPROVING QUALITY OF SERVICE FOR WIRELESS LANS

CROSS-REFERENCE TO RELATED APPLICATIONS

This application is a continuation of U.S. patent application Ser. No. 11/390,704 filed on Mar. 28, 2006. This application claims the benefit of U.S. Provisional Application No. 60/738,267, filed on Nov. 18, 2005. The disclosure of the above application is incorporated herein by reference in its entirety.

FIELD OF THE INVENTION

The present invention relates to wireless networks, and more particularly to systems and methods for improving quality of service in wireless networks.

BACKGROUND OF THE INVENTION

IEEE sections 802.11, 802.11(a), 802.11(b), 802.11(g), 802.11(h), 802.11(n), 802.16, 802.20, which are incorporated herein by reference in their entirety, define ways for configuring wireless networks and network devices. According to these standards, a wireless Ethernet network device may operate in an ad-hoc mode or an infrastructure mode.

Referring now to FIG. 1, in the ad-hoc mode, each client station 10-1, 10-2, . . . , and 10-N (collectively client stations 10) communicates directly with other client stations without requiring an access point (AP). Referring now to FIG. 2, in the infrastructure mode, each client station 20-1, 20-2, . . . , and 20-M (collectively client stations 20) communicates with other client stations through an AP 24. The AP 24 may provide a connection to a network 26, a server 28, and for the Internet 30.

In the infrastructure mode, the AP 24 and the client stations 20 that use the AP 24 constitute a basic service set (BSS). A wireless network can comprise multiple BSS's. Each BSS is identified by a unique identifier for the AP in the BSS, called a BSSID. Typically, the AP transmits a beacon to inform the client stations in the BSS that the AP is ready to communicate with the client stations. The beacon includes the BSSID for the AP. The client stations in the BSS, in turn, communicate with the AP using the BSSID.

Referring nosy to FIG. 3, a network device such as an AP or a client station may be implemented using a system on chip (SOC) circuit 40 and/or individual components. The SOC circuit 40 generally includes one or more processors 42, a medium access controller (MAC) device 44, a base band processor (BBP) 46, and a host interface such as a peripheral component interface (PCI) (not shown). Additionally, the SOC circuit 40 may include a radio frequency (RF) transceiver 48, or the transceiver may be located externally.

Most modern wireless networks comprise different types of network devices as client stations. For example, in the wireless network shown in FIG. 2, the client station 20-1 may be a video device such as a high definition TV that may be utilized in applications such as video-conferencing. The client station 20-2 may be an audio device. Additionally, the client station 20-M may be a laptop computer that may be used to transfer files, exchange emails etc.

Different types of client stations may utilize different applications running on the network and may generate different data streams. For example, the client station 20-1 may generate data streams comprising video and audio data. The client station 20-2 may generate data streams comprising audio data. The client station 20-M may generate data streams comprising text files, etc. Thus, different types of data streams may concurrently flow through the network.

Network users generally expect their individual applications to run smoothly regardless of other applications that concurrently utilize the network. Networks, however, have finite resources. For example, bandwidth of a network is limited. Therefore, networks typically service data streams of different applications at different priority levels to optimize network resources and deliver optimum performance to network users. For example, a network may service data streams of a video-conferencing application at a higher priority than data streams of an audio application or an email application.

Additionally employs admission control mechanisms to ensure that resources are not over-stretched. Admission control mechanisms allow applications to join the network only when available resources are adequate to optimally run the applications, meet the Quality of Service (QoS) requirements The priority given to data streams, however, should be such that a data stream given a low priority is not substantially delayed or entirely lost. Quality of service (QOS) refers to an ability of a network to provide a particular level of service to a selected data stream. IEEE section 802.11e defines QOS mechanisms for wireless networks and is incorporated herein by reference in its entirety.

QOS mechanisms in wireless networks generally comprise scheduling mechanisms and signaling mechanisms that an access point uses to service applications used by client stations. Scheduling mechanisms ensure that different data streams in a network receive adequate priority to link to the network. Scheduling mechanisms are incorporated along with complimentary admission control mechanisms. Signaling mechanisms notify the network of a priority and characteristics of a data stream. Signaling mechanisms typically use protocols that request and establish a link to the network for a data stream.

For example, a signaling mechanism called resource reservation protocol (RSVP) enables an application to request the network for a specific level of service for a data stream and to dynamically service a part of network bandwidth for the data stream. Thus, the client station 20-1 may request the AP 24 a priority_1 for data streams of the video-conferencing application. The client station 20-2 may request the AP 24 a priority_2 for data streams of the audio application, where priority_2 is a lower priority level than priority_1, etc.

Signaling mechanisms, however, burden network traffic. Additionally, signaling mechanisms use protocols that are preconfigured based on factors such as network resources, user demand, etc. Thus, signaling mechanisms lack flexibility and scalability. Additionally, signaling mechanisms need end-to-end support. That is, all devices need to implement the same signaling stack. The disparate nature of devices, however, precludes wide-spread adaptation of a single signaling protocol.

Scheduling of data streams in wireless networks may be improved by pre-configuring client stations with pre-set stream descriptors and service priority levels. The service priority levels can be pre-set based on a class of service a client station requires. The traffic characteristics of data streams can be set based on the perceived general behavior of network connections.

An AP may decipher a service priority level and stream descriptors from a data stream received from the client station. The AP can service the data stream according to that priority level and stream descriptors. This scheme, however may be problematic since different original equipment manufacturers (OEM's) may assign service priority levels and stream descriptors to network devices (client stations) differently.

SUMMARY OF THE INVENTION

An access point (AP) comprises a control module that defines N basic service set identifiers (BSSID's) each corresponding to a class of service and having M service parameters, where N and M are integers greater than one. The AP comprises an AP scheduling module that schedules communication between the AP and a plurality of client stations based on the N BSSID's and that determines a quality of service for the communication based on the N BSSID's and the M service parameters. The M service parameters comprise service priority levels, a number of data streams, and unscheduled automatic power save delivery settings for the N BSSID's.

In another feature, a wireless network comprises the AP and further comprises P client stations, where P is an integer greater than one. Each of the P client stations comprises a client station scheduling module that schedules communication between the AP and the P client stations based on the N BSSID's and that determines a quality of service for the communication based on the N BSSID's and the M service parameters. The P client stations selectively communicate with the AP using more than one of the N BSSID's.

In another feature, the AP further comprises a multicast BSSID that is used to transmit data simultaneously to client stations identified by one of the N BSSID's.

In another feature, the control module selectively divides the N BSSID's into multiple BSSID's each having one data stream.

In still other features, a method for improving quality of service in wireless networks comprises defining N basic service set identifiers (BSSID's) for an access point (AP) wherein each one of the N BSSID's corresponds to a class of service and has M service parameters, where N and M are integers greater than one. The method comprises scheduling communication between the AP and a plurality of client stations based on the N BSSID's.

In another feature, the method comprises determining a quality of service for the communication based on the N BSSID's and the M service parameters. The M service parameters comprise service priority levels, a number of data streams, and unscheduled automatic power save delivery settings for the N BSSID's. The method comprises the client stations selectively communicating with the AP based on more than one of the N BSSID's.

In another feature, the method further comprises transmitting data simultaneously to client stations identified by one of the N BSSID's based on a multicast BSSID.

In another feature, the method further comprises selectively dividing the N BSSID's into multiple BSSID's each having one data stream.

In still other features, an access point (AP) comprises control means for defining N basic service set identifiers (BSSID's) each corresponding to a class of service and having M service parameters, where N and M are integers greater than one. The AP comprises AP scheduling means for scheduling communication between the AP and a plurality of client stations based on the N BSSID's and for determining a quality of service for the communication based on the N BSSID's and the M service parameters. The M service parameters comprise service priority levels, a number of data streams, and unscheduled automatic power save delivery settings for the N BSSID's.

In another feature, a wireless network comprises the AP and further comprises P client stations, where P is an integer greater than one. Each of the P client stations comprises client station scheduling means for scheduling communication between the AP and the P client stations based on the N BSSID's and for determining a quality of service for the communication based on the N BSSID's and the M service parameters. The P client stations selectively communicate with the AP using more than one of the N BSSID's.

In another feature, the AP further comprises multicast BSSID means for transmitting data simultaneously to client stations identified by one of the N BSSID's.

In another feature, the control means selectively divides the N BSSID's into multiple BSSID's each having one data stream.

In still other features, a computer method for improving quality of service in wireless networks comprises defining N basic service set identifiers (BSSID's) for an access point wherein each one of the N BSSID's corresponds to a class of service and has M service parameters, where N and M are integers greater than one. The computer method comprises scheduling communication between the AP and a plurality of client stations based on the N BSSID's.

In another feature, the computer method comprises determining a quality of service for the communication based on the N BSSID's and the M service parameters. The M service parameters comprise service priority levels, a number of data streams, and unscheduled automatic power save delivery settings for the N BSSID's.

In another feature, the computer method further comprises client stations selectively communicating with the AP based on more than one of the N BSSID's.

In another feature, the computer method further comprises transmitting data simultaneously to client stations identified by one of the N BSSID's based on a multicast cast BSSID.

In another feature, the computer method further comprises selectively dividing the N BSSID's into multiple BSSID's each having one data stream.

In still other features, a client station comprises a scheduling module that schedules communication between the client station and an access point (AP) based on N basic service set identifiers (BSSID's), where N is an integer greater than one, and a quality of service (QOS) determining module that determines QOS for the communication based on the N BSSID's and M service parameters, where M is an integer greater than one.

In another feature, the client station selectively communicates with the AP using more than one of the N BSSID's.

In another feature, the M service parameters comprise service priority levels, a number of data streams, and unscheduled automatic power save delivery settings for the N BSSID's.

In another feature, a wireless network comprises the client station and further comprises the AP wherein the AP comprises a control module defines the N BSSID's each corresponding to a class of service and having the M service parameters and an AP scheduling module that schedules communication between the AP and a plurality of client stations based on the N BSSID's and that determines a quality of service for the communication based on the N BSSID's and the M service parameters.

In another feature, the AP further comprises a multicast BSSID that is used to transmit data simultaneously to client stations identified by one of the N BSSID's. The control module of the AP selectively divides the N BSSID's into multiple BSSID's each having one data stream.

In still other feature, a method for improving quality of service in wireless networks comprises scheduling communication between the client station and an access point (AP) based on N basic service set identifiers (BSSID's), where N is an integer greater than one, and determining a quality of service for the communication based on the N BSSID's and M service parameters, where M is an integer greater than one.

In another feature, the method further comprises selectively communicating with the AP using more than one of the N BSSID's.

In another feature, the M service parameters comprise service priority levels a number of data streams, and unscheduled automatic power save delivery settings for the N BSSID's.

In another feature, the method further comprises defining the N BSSID's for the AP wherein each one of the N BSSID's corresponds to a class of service and has the M service parameters, where N and M are integers greater than 1 scheduling communication between the AP and a plurality of client stations based on the N BSSID's, and determining a quality of service for the communication based on the N BSSID's and the M service parameters.

In another feature, the method further comprises transmitting data simultaneously to client stations identified by one of the N BSSID's based on a multicast BSSID.

In another feature, the method further comprises selectively dividing the N BSSID's into multiple BSSID's each having one data stream.

In still other features, a client station comprises scheduling means for scheduling communication between the client station and an access point (AP) based on N basic service set identifiers (BSSID's), where N is an greater than one, and quality of service (QOS) determining means for determining QOS for the communication based on the N BSSID's and M service parameters, where M is an integer greater than one.

In another feature, the client station selectively communicates with the AP using more than one of the N BSSID's.

In another feature, the M service parameters comprise service priority levels, a number of data streams, and unscheduled automatic power save deliver settings for the N BSSID's.

In another feature, a wireless network comprises the client station and further comprises the AP wherein the AP comprises control means for defining the N BSSID's each corresponding to a class of service and having the M service parameters, and AP scheduling means for scheduling communication between the AP and a plurality of client stations based on the N BSSID's and for determining a quality of service for the communication based on the N BSSID's and the M service parameters.

In another feature, the AP further comprises multicast BSSID means for transmitting data simultaneously to client stations identified by one of the N BSSID's.

In another feature, the control means selectively divides the N BSSID's into multiple BSSID's each having one data stream.

In still other features, a computer method for improving quality of service in wireless networks, comprising scheduling communication between the client station and an access point (AP) based on N basic service set identifiers (BSSID's), where N is an integer greater than one, and determining a quality of service for the communication based on the N BSSID's and M service parameters, where M is an integer greater than one.

In another feature, the computer method further comprises selectively communicating with the AP using more than one of the N BSSID's.

In another feature, the M service parameters comprise service priority levels, a number of data streams, and unscheduled automatic power save delivery settings for the N BSSID's.

In another feature, the computer method further comprises defining the N BSSID's for the AP wherein each one of the N BSSID's corresponds to a class of service and has the M service parameters, where N and M are integers greater than 1, scheduling communication between the AP and a plurality of client stations based on the N BSSID's, and determining a quality of service for the communication based on the N BSSID's and the M service parameters.

In another feature, the computer method further comprises transmitting data simultaneously to client stations identified by one of the N BSSID's based on a multicast BSSID.

In another feature, the computer method further comprises selectively dividing the N BSSID's into multiple BSSID's each having one data stream.

In still other features, the systems and methods described above are implemented by a computer program executed by one or more processors. The computer program can reside on a computer readable medium such as but not limited to memory, non-volatile data storage and/or other suitable tangible storage mediums.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
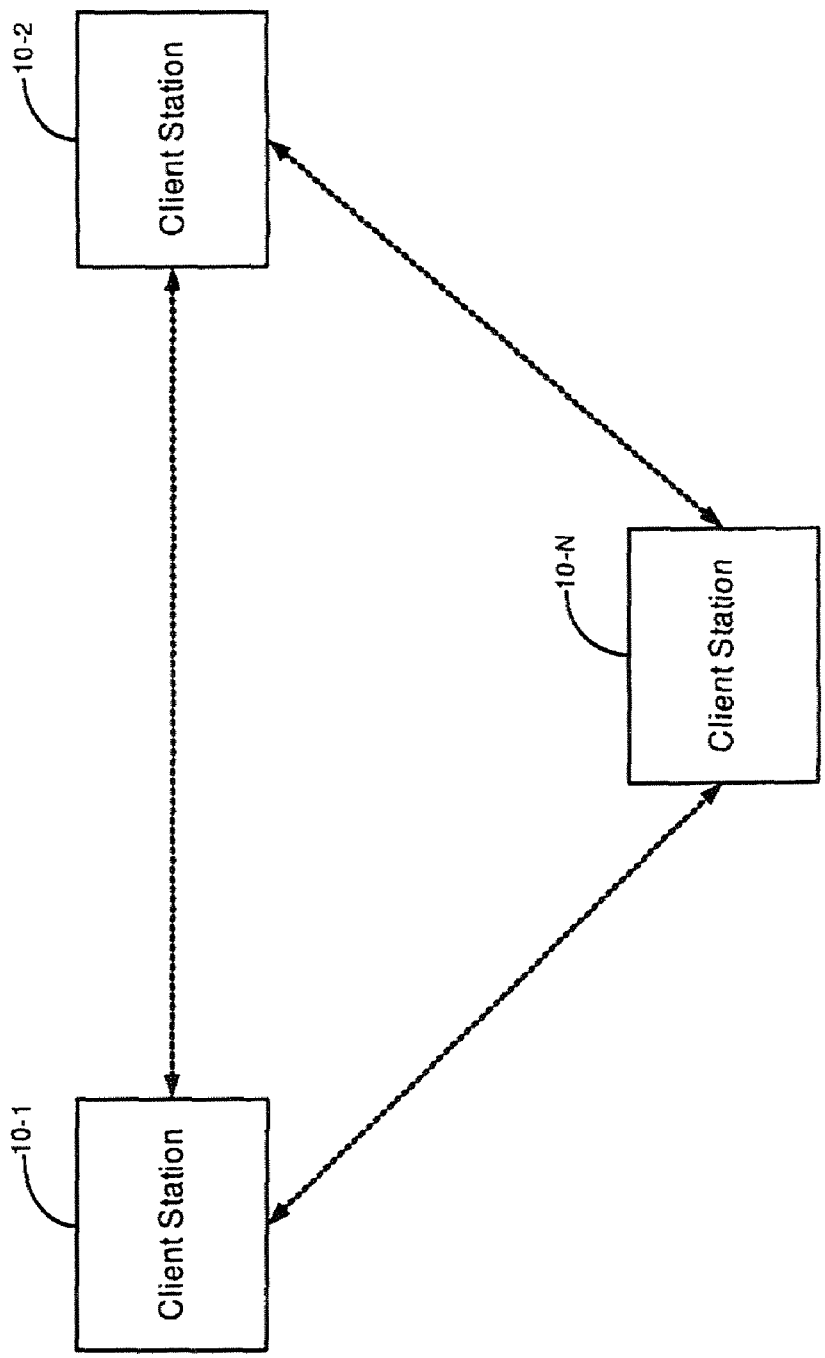
FIG. 1 is a functional block diagram of an exemplar) wireless network illustrating network devices operating in an ad-hoc mode according to the prior art.
Figure 2:
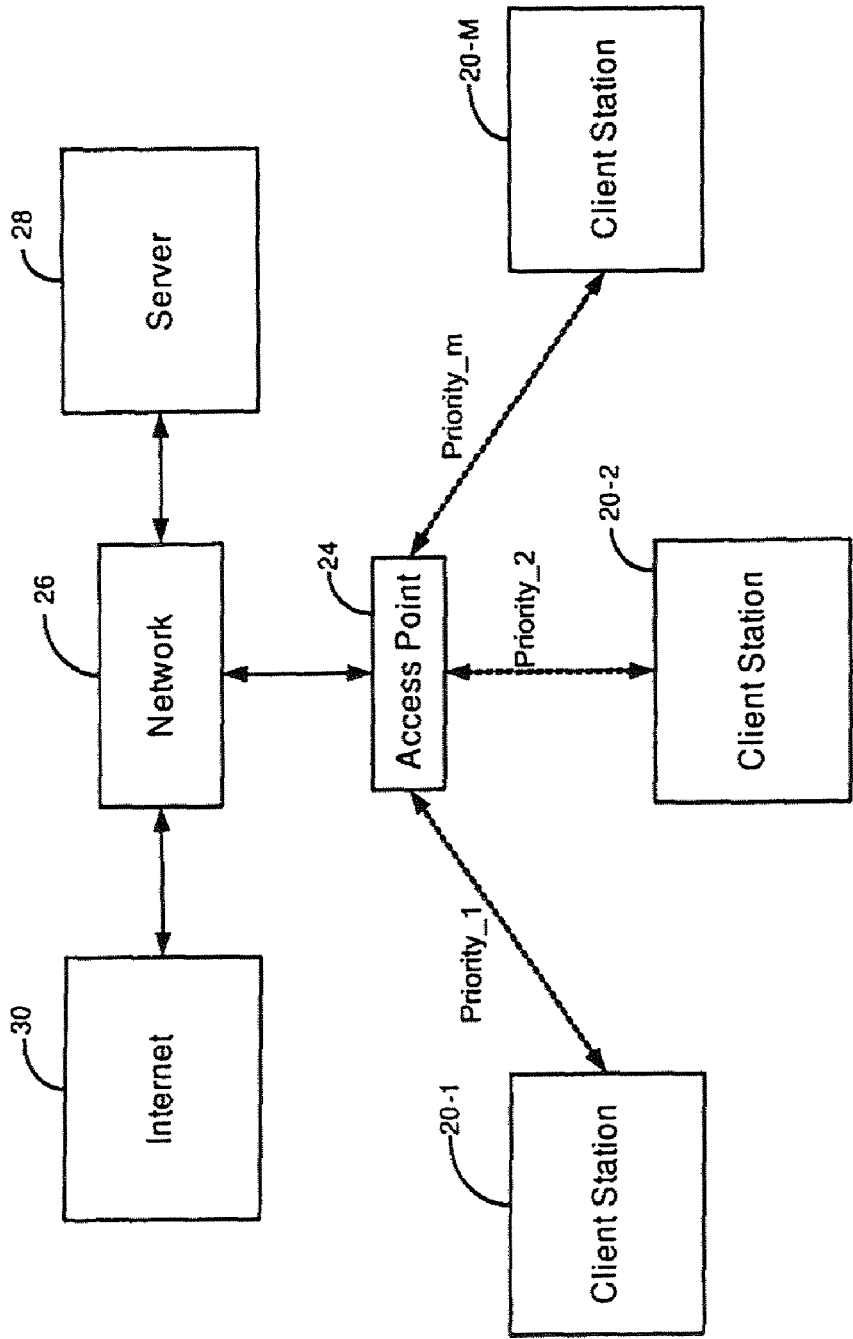
FIG. 2 is a functional block diagram of an exemplary wireless network illustrating network devices operating in an infrastructure mode according to the prior art.
Figure 3:
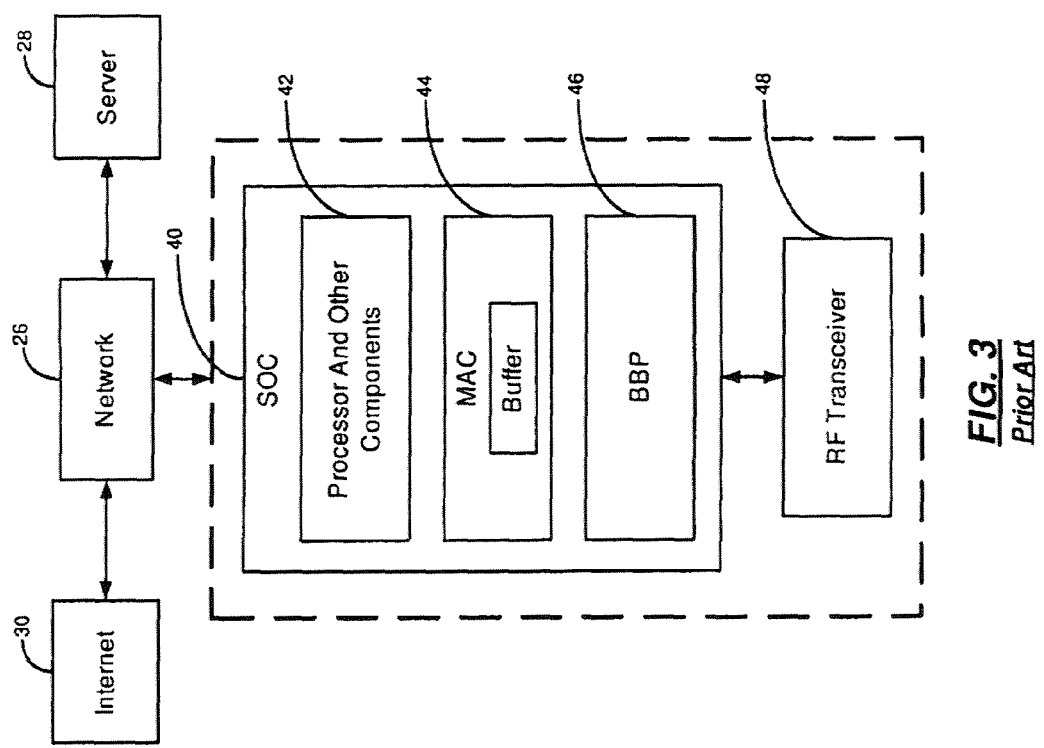
FIG. 3 is a functional block diagram of a wireless network device illustrating an exemplary implementation using an SOC circuit according to the prior art.

The following description of the preferred embodiment(s) is merely exemplary in nature and is in no way intended to limit the invention, its application, or uses. For purposes of clarity, the same reference numbers will be used in the drawings to identify elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein the phrase at least one of A, B, and C should be construed to mean a logical (A or B or C), using a non-exclusive logical or. It should be understood that steps within a method may be executed in different order without altering the principles of the present invention.

An access point (AP) is divided into multiple virtual access points. Client stations of a particular type are associated with a dedicated virtual AP to form multiple basic service sets (BSS's). A distinct BSS identifier (BSSID) is assigned to each individual BSS. Service parameters for each BSS are predetermined. The AP is pre-programmed with the service parameters. The AP communicates with a client station in a BSS based on the service parameters for ha BSS. The AP provides a quality of service (QOS) to a data stream to and from client stations in a BSS using the service parameters for the BSS instead of using a signaling mechanism.

Figure 4:
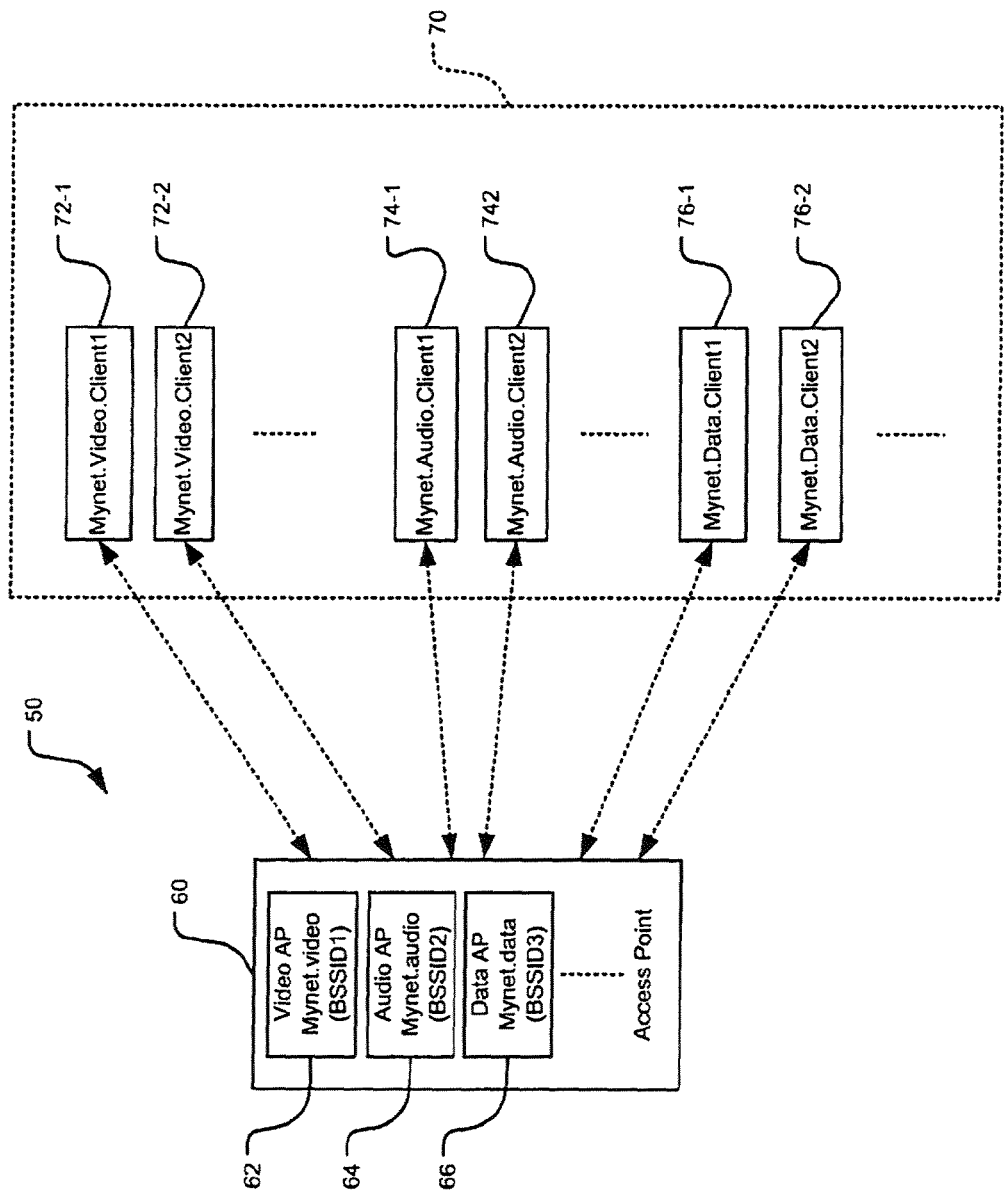
FIG. 4 is a functional block diagram of an exemplary wireless network including an access point and a plurality of client stations according to the present invention.
Figure 5:
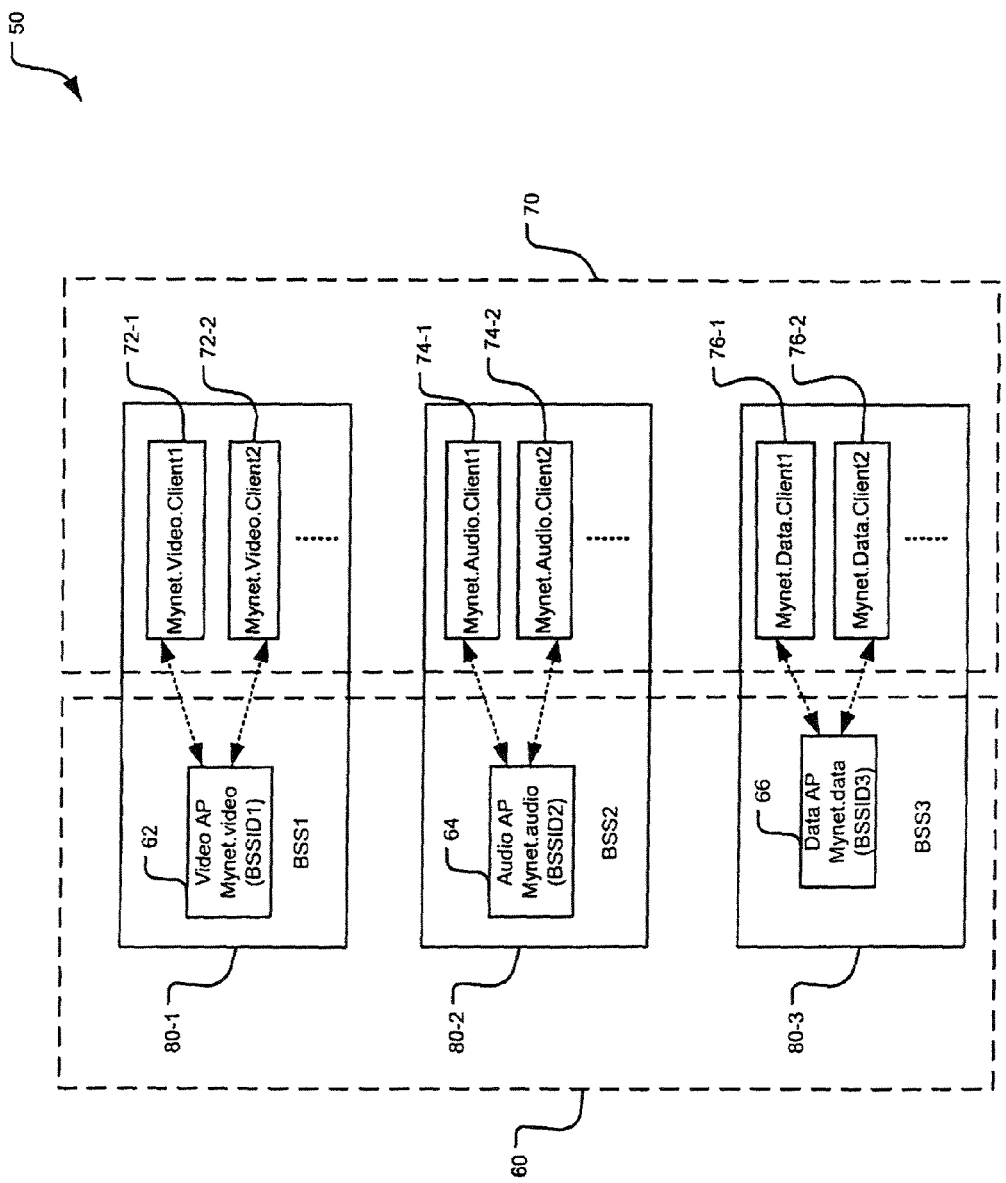
FIG. 5 is a functional block diagram of an exemplary wirelessly network comprising a plurality of basic services sets comprising a plurality of virtual access points and a plurality of client stations according to the present invention.

Referring now to FIGS. 4-5, a wireless network 50 comprising an AP 60 and multiple client stations 70 is divided into multiple virtual networks. Specifically, the AP 60 is divided into multiple virtual access points such as a video AP 62, an audio AP 64, a data AP 66, etc. (collectively virtual AP).

Each of the virtual APs has a unique basic service set identifier (BSSID). The BSSID's may be simple descriptive strings announcing the type of the virtual AP. For example, the video AP 62 may have a BSSID of Mynet.video (or BSSID1), the audio AP 64 may have a BSSID of Mynet.audio (or BSSID2), the data AP 66 may have a BSSID of Mynet.data (or BSSID3), etc.

Multiple client stations 70 in the network 50 are divided into different groups based on a class of service of each client station. For example, video client stations video.client1 72-1, video.client2 72-2, etc., (collectively video client stations 72) associate with Mynet.video virtual AP 62. Audio client stations audio.client1 74-1, Mudio.client2 74-2, etc., (collectively audio client stations 74) associate with Mynet.audio virtual AP 64. Data client stations data.client1 76-1, data.client2 76-2, etc., (collectively data client stations 76) associate with Mynet.data virtual AP 66, etc.

Multiple BSS's are firmed wherein each BSS comprises one virtual AP and one group of client stations. For example. BSS1 80-1 comprises the video AP 62 and the video client stations 72. BSS2 80-2 comprises the audio AP 64 and the audio client stations 74, BSS3 80-3 comprises the data AP 66 and the data client stations 76, etc. BSS1 80-1, BSS2 80-2, BSS3 80-3, etc., are hereinafter collectively referred to as BSS 80.

Each BSS 80 is assigned the BSSID of the respective virtual AP. For example, BSS1 80-1 is assigned the BSSID Mynet.video, BSS2 80-2 is assigned the BSSID Mynet.audio, BSS3 80-3 is assigned the BSSID Mynet.data, etc. The AP 60 uses the BSSID's instead of signaling mechanisms to communicate with client stations 70 in BSS 80.

Figure 6:
FIG. 6 illustrates an exemplary service table comprising parameters for programming an access point according to the present invention.

Referring now to FIG. 6, a service table 90 is generated. Specifically, service parameters such as a BSSID for each BSS 80 a service priority level for each BSS 80, a maximum number of allowable data streams per BSSID, etc., are determined based on a class of service of each BSS 80. For example, the number of allowable data streams for a BSS 80 can be calculated as follows.

If bandwidth of network 50 is 100 Mbps and if a throughput rate of video.client1 71-1 such as a high-definition TV is 25 Mbps, then a number of data streams for BSSID1 may be set equal to 2. This setting will allocate 50 Mbps (I.e., 2×25 Mbps) of the 100 Mbps network bandwidth for BSSID1. This bandwidth allocation will be sufficient for two client stations video.client1 72-1 and video.client2 72-2 in BSS1 80-1 to receive QOS from the network 50. That is, the client stations video.client1 72-1 and video.client2 72-2 in BSS1 80-1 will perform optimally without any data loss. In other words, each client station 72 in BSS1 80-1 will be guaranteed QOS from the network 50.

Different categories of classes of service can be created based on types of network devices (e.g., video, audio, etc.). Service parameters such as service level priorities for data streams, throughput rates, etc., for each service class can be set in the service table 90.

Figure 7:
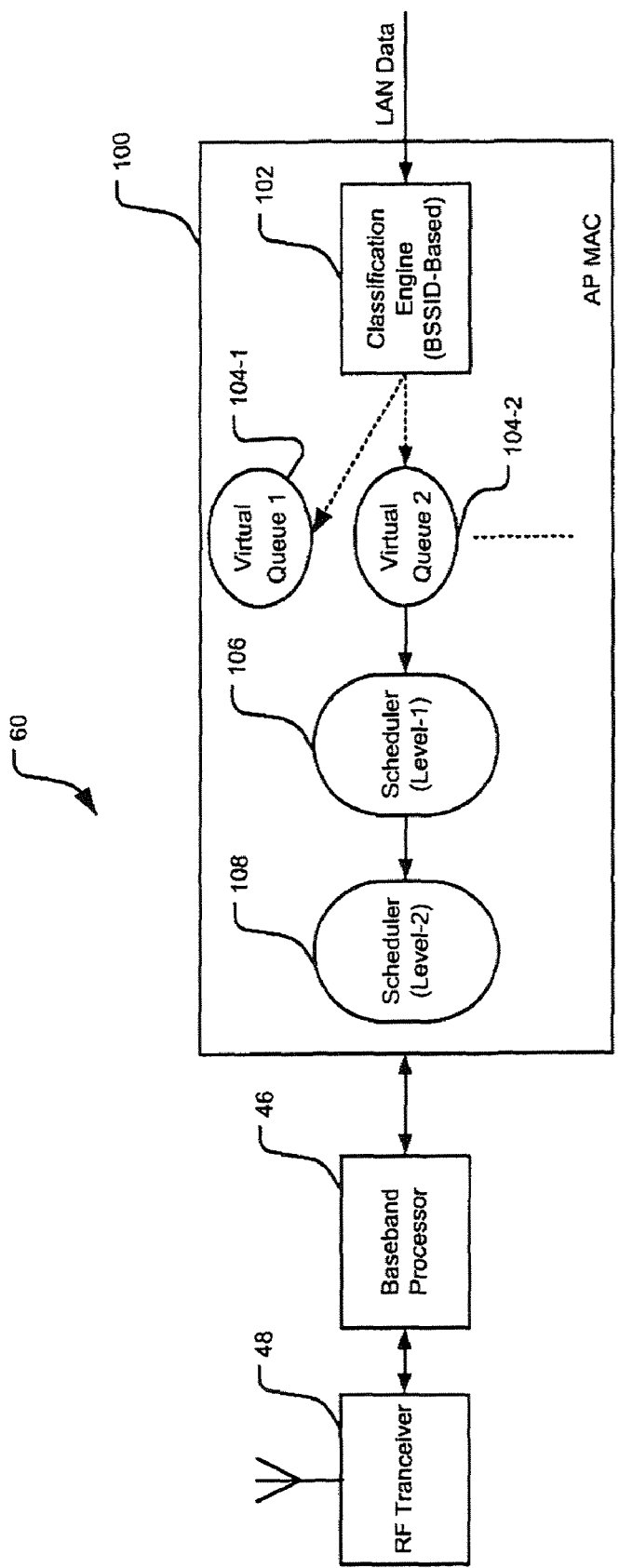
FIG. 7 is a functional block diagram of an exemplary media access controller utilizing a scheduling scheme according to the present invention.

Referring now to FIG. 7, the AP 60 comprises a medium access control (MAC) module 100. The MAC module 100 comprises a classification engine 102, virtual queues 104-1, 104-2, etc. (collectively 104), a level-1 scheduler 106, and a level-2 scheduler 108.

Based on the BSSID, the classification engine 102 routes the input data to one of the virtual queues 104. The virtual queue 104 routes the data to a virtual AP that corresponds to the BSSID. The level-1 scheduler 106 schedules service for the BSS's 80. The level-2 scheduler 108 schedules service for the client stations 70 within each BSS 80 according to the service parameters in the service table 90.

For the upstream data, from the client to the AP 60 or for peer-to-peer data between two clients, the AP 60 uses service parameters of a traffic class and a scheduler state to announce transmission opportunities (TxOPs) so a client station 70 can transmit during these TxOPs.

Quality of service (QOS) may be achieved in two ways: distributed QOS or QOS by centralized scheduling. In the distributed QOS approach, the service table 90 serves as an access control list. Specifically, service parameters such as number of BSS's 80, maximum number of data streams per BSS 80, etc., are used to limit the number of client stations 70 in a BSS 80 that can access the network 50. Limiting the number of data streams per BSSID facilitates admission control. That is, the number of data streams per BSSID determines the number of client stations that can be added to a particular BSS 80.

When a new network device (i.e., a new client station 70) is added to the network 50, the device is added to an appropriate BSS 80 based on the type of the device (e.g., video, audio, etc.), that is, based on the class of service the device requires. The virtual AP for the BSS 80 to which the new client station 70 is added automatically services the client station 70 based on the service parameters for the BSS 80 without requiring any signaling mechanism. The added client station 70 receives the QOS guaranteed for the BSS 80 to which the client station 70 is added. No network reconfiguration or modification is required to properly service the newly added device.

For example, when a new video device is added to the network 50, the new video device is added as a client station video.client(n) to Mynet.video BSS 80-1. The video AP 62 automatically services video.client(n) according to the service parameters set for Mynet.video BSS 80-1 in the service table 90. Video.client(n) automatically receives the QOS guaranteed to Mynet.video BSS 80-1.

Additionally, arbitrary client stations 70 that do not conform to the parameter settings in the service table 90 are denied access to the network 50. Specifically, based on the number of data streams is set for a BSS 80, an arbitrary client station 70 that is not part of a BSS 80 is denied access to the network 50. Thus, traffic between the AP 60 and the client stations 70 is controlled by limiting the number of client stations 70 per BSS 80 in the service table 90.

In centralized scheduling, the service table 90 is used to program a scheduler or a set of schedulers in the AP 60. The virtual AP's communicate with the respective BSS's 80 using the BSSID's of the respective BSS's 80. Each virtual AP services the client stations 70 within that BSS 80 using the BSSID of the BSS 80 and the service parameters in the service table 90 for that BSS 80. The virtual AP's do not use any signaling mechanisms to service the client stations 70. Instead, each virtual AP schedules traffic to and from the client stations 70 in a BSS 80 based on the BSSID of the BSS 80 and based on the service parameters for the service class of the BSS 80.

Specifically, the level-1 scheduler 106 and the level-2 scheduler 108 schedule service for the data streams of the client stations 70 in the BSS's 80. The level of priority for the service that a data stream of a client station 70 receives is based on the service parameters in the service table 90 for the BSS 80 that comprises the client station 70. The level-1 scheduler 106 schedules service for the BSS's 80. The level-2 scheduler 108 schedules service for the client stations 70 within each BSS 80 according to the service parameters in the service table 90. A scheduler essentially creates transmit opportunities for virtual AP's to transmit data to client stations 70 within time slots reserved for each BSS 80 according to the service table 90. Level-1 and level-2 schedulers can be combined into one scheduler, and traffic can be scheduled in multiple ways.

Figure 9:
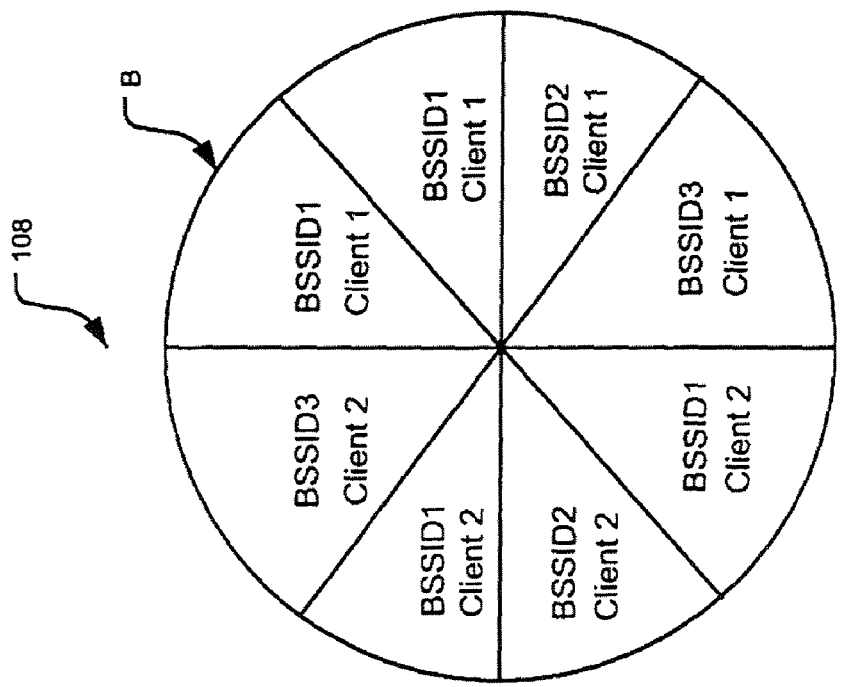
FIG. 9 shows an exemplary scheme for scheduling quality of service for a plurality of client stations in a plurality of basic service sets according to the present invention.
Figure 8:
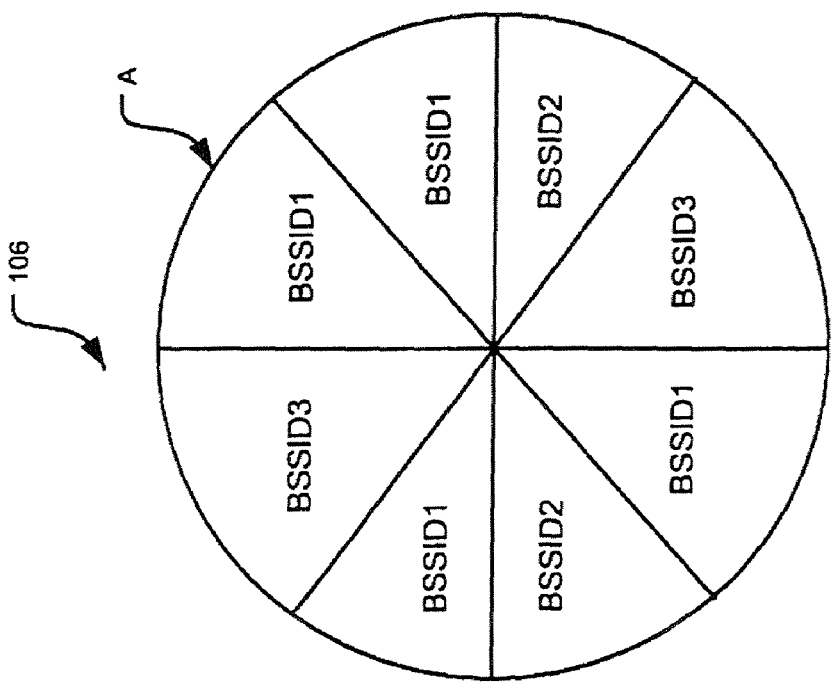
FIG. 8 shows an exemplary scheme for scheduling quality of service for a plurality of basic service sets according to the present invention.

Referring now to FIGS. 8-9, the level-1 scheduler 106 and the level-2 scheduler use a round-robin scheme to schedule transmit times for BSS's 80 and client stations 70 within the BSS's 80, respectively. For example, assuming transmission begins with BSS1 80-1 as indicated by an arrow marked "A" in FIG. 8 and proceeding clockwise, the level-1 scheduler 106 schedules transmit times for the BSS's 80 in the following order. BSSID1, BSSID1, BSSID2, BSSID3, BSSID1, BSSID2, BSSID1, and BSSID3.

The level-2 scheduler 108 schedules times for individual client stations 70 within the respective BSS's 80. For example, assuming transmission begins with client1 72-1 in BSS1 80-1 as indicated by an arrow marked "B" in FIG. 9 and proceeding clockwise, the level-2 scheduler 108 schedules transmit times for the client stations 70 within the BSS's 80 in the following order. BSSID1/Client1 BSSID1/Client1, BSSID2/Client1, BSSID3/Client1, BSSID1/Client2, BSSID2/Client2, BSSID1/Client2, and BSSID3/Client2.

Figure 10:
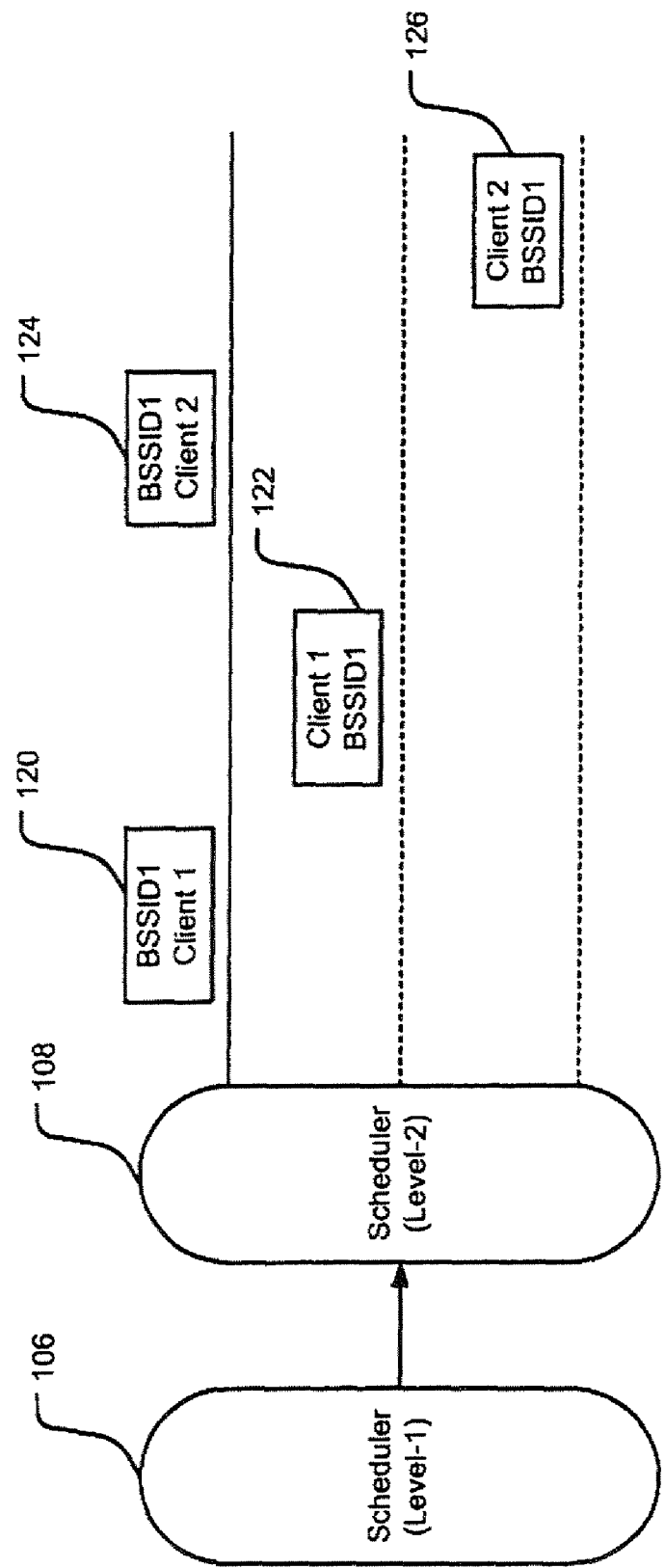
FIG. 10 shows an exemplary polling scheme used by client stations in a BSS to receive data from an access point according to the present invention.

Referring now to FIG. 10, data received by client stations 70 is not managed by queues 104. Level-1 scheduler 106 and level-2 scheduler 108 manage the data received by the client stations 70. FIG. 10 shows an exemplary polling scheme used to receive data by two client stations 70 in a BSS 80.

For example, Client1 72-1 in BSS1 80-1 transmits a request 120 for data to the virtual AP 62. When Client1 72-1 gains priority based on the round-robin scheduling scheme, Client1 72-1 receives data 122 from the virtual AP 62. Similarly, Client2 72-2 in BSS1 80-1 transmits a request 124 for data to the virtual AP 62. When Client2 72-2 gains priority based on the round-robin scheduling scheme, Client2 72-2 receives data 126 from the virtual AP 62, etc.

Additionally, unscheduled automatic power save delivery settings for client stations 70 can also be defined in the service table 90. Generally, a client station 70 may go to sleep and request service upon waking up. Typically, a client station 70 informs an AP 60 when the client station 70 is going to sleep and when the client station 70 will wake up.

A parameter can be defined in the service table 90 to limit the number times a client station 70 may wake up. That is, a client station 70 in a BSS 80 may be programmed to sleep longer than normal. In other words, although a client station 70 in a BSS 80 wakes up, the virtual AP corresponding to the BSS 80 may ignore a request from the client station 70 if that virtual AP is not currently scheduled to service the BSS 80. The virtual AP services the client station 70 only when the virtual AP is scheduled to service the BSS 80 that comprises that client station 70.

The round-robin scheduling scheme for level-1 scheduler 106 and level-2 scheduler 108 can be predetermined, and the AP 60 can be pre-programmed accordingly. The round-robin scheduling scheme does not use a signaling mechanism such as RSVP protocol to schedule and guarantee QOS.

Instead, the round-robin scheduling scheme uses the BSSID of a BSS 80 and the service parameters for the BSS 80 in the service table 90 to guarantee QOS for the BSS 80 and to the client stations 70 within that BSS 80. Additionally, the round-robin scheduling scheme limits access to a service class by limiting a number of client stations 70 that can join a BSS 80 based on service parameters such as the number of data streams per BSS 80 set in the service table 90.

Figure 11:
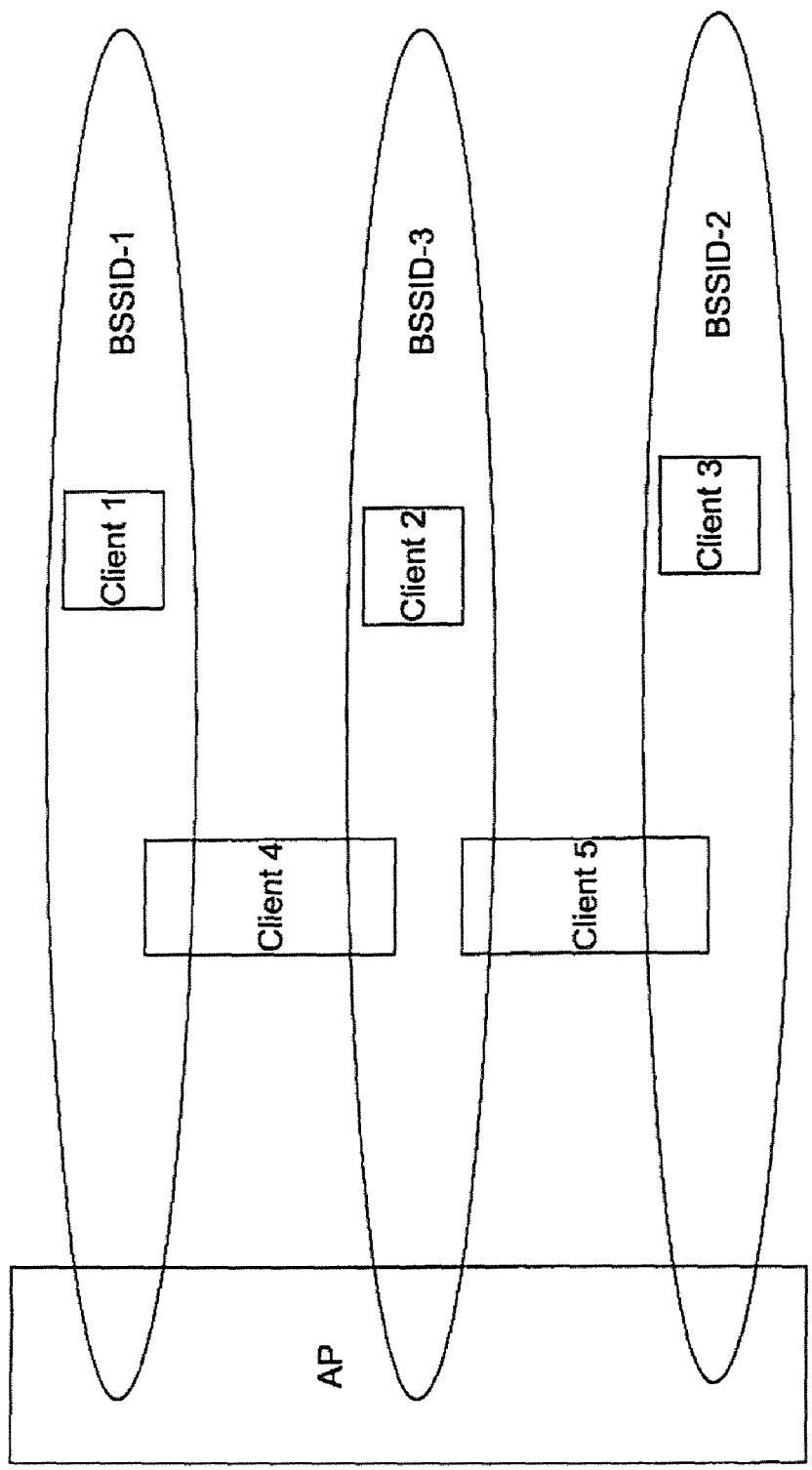
FIG. 11 shows an example of a client station sharing more than one basic service set in a wireless network according to the present invention.

Referring now to FIG. 11, a single client station such as Client4 may occasionally be part of more than one BSS and therefore may share multiple BSSID's. For example, Client4 may be a laptop computer that is used for video-conferencing and for downloading a text file simultaneously. In that case, Client 4 may share BSSID1 (for video service) and BSSID3 (for data service). Thus, Client4 can receive different QOS for video and data streams.

The AP 60 treats Client 4 as two virtual client stations with two virtual MAC addresses. A virtual client station using a video application is serviced by the video AP 61, and a virtual client station downloading a text file is serviced by the data AP 66. Each virtual client station is serviced by the respective virtual AP according to the schedule set for the respective virtual AP in the service table 90. A module such as a service client may be installed in an appropriate layer of an operating system of a computer such as Client4 to emulate multiple virtual clients as described herein.

When a consumer buys a new network device such as a high definition TV, the consumer may add the TV to the network 50 as follows. The consumer powers up the TV. The consumer uses a remote control to bring up a network configuration menu on the TV screen. From the menu, the consumer selects a virtual AP of an appropriate BSS 80 based on the service class of the device being added. For example, to add the TV, the consumer may select a video AP 62 that may be entitled Mynet.video. The TV joins the network as Mynet.video.client1 or Mynet.video.client2.

The selection of Mynet.video.client1 or Mynet.video.client2 automatically associates the TV with the video AP 62. The TV receives a quality of service that is guaranteed to the video AP 62 based on the parameter settings in the service table 90 for video AP 62. The number of data streams for the video AP 62 in the service table 90 determines whether the consumer can add the TV to the network 50. The TV is precluded from joining the network 50 if available bandwidth is insufficient to provide adequate QOS to the TV. Thus, the number of data streams setting serves as an admission control feature that limits the number of devices that can access the network 50.

If a network 50 has multiple TV's, an additional BSSID called a multicast BSSID may be added to the service table 90. The multicast BSSID functions like a TV broadcast station. The number of channels that a multicast BSSID can transmit is limited to the number of data streams pre-set for the video AP 61. Multiple TV's can queue into one of the data streams.

Occasionally, a consumer may wish to view an identical channel on more than one TV, or two viewers may wish to watch an identical data stream on two TV's. A simple multicast, however, is not sufficient when the two TVs are located in different environments and receive different network performance. In that case, a content-based differentiation is needed to route identical data to more than one client station. This is achieved by subdividing the video AP 62 into multiple BSSID's such as Mynet.video1, Mynet.video2, etc., and by assigning one data stream per BSSID.

For example, a first BSSID and a first of the two data streams for the video AP 62 may be assigned to mynet.video1 that services a first TV. A second BSSID and a second of the two data streams for the video AP 62 may be assigned to Mynet.video2 that services a second TV. The TV connected to mynet.video1 and the TV connected to Mynet.video2 will display the same channel. Service priority levels for Mynet.video1 and Mynet.video2 may be set differently.

When the number of TV's seeking access to the network 50 exceeds the total number of data streams pre-set for the video AP 62, the additional TV may be denied access to the network. Alternatively, the additional TV may attempt to join either the mynet.video1 virtual AP or the mynet.video2 virtual AP. The consumer may accomplish this by trying to select an appropriate AP in the network configuration menu of the TV using the remote control for the TV. If Mynet.video1 and Mynet.video2 are unavailable, the additional TV may join the network after one of Mynet.video1 and Mynet.video2 becomes available.

Figure 12:
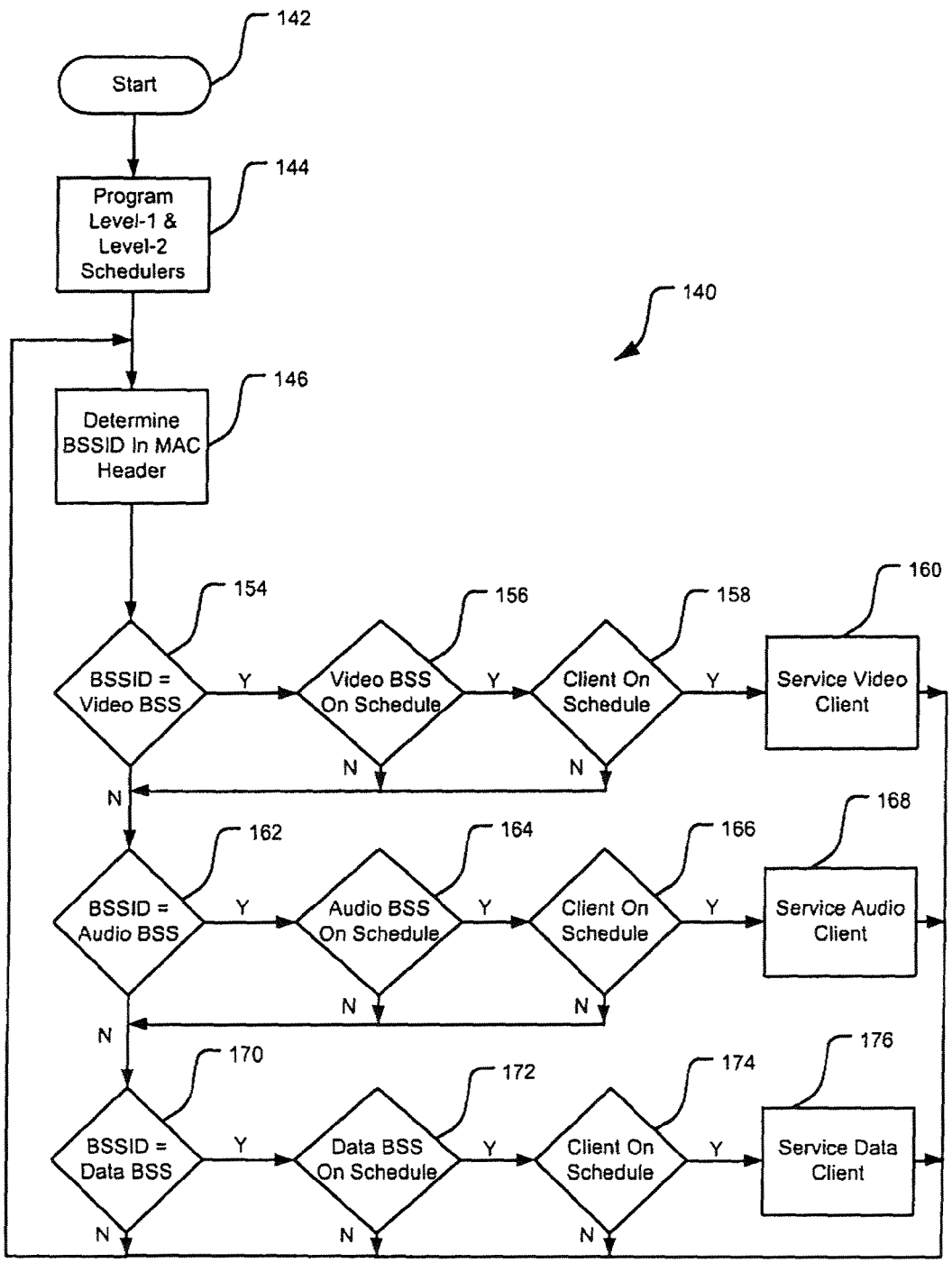
FIG. 12 is a flowchart of an exemplary method for providing quality of service to a plurality of client stations in a wireless network according to the present invention.

Referring now to FIG. 12, an exemplary method 140 for providing QOS using virtual AP's begins in step 142. Using the method 140, a MAC module 100 determines which client station 70 in a BSS 80 should be serviced based on a BSSID in a header of input data. To simplify explanation, the method 140 is shown to provide QOS to client stations 70 that utilize three classes of service, (i.e., video, audio, and data). As can be appreciated, however, QOS can be similarly provided to client stations 70 that may utilize many more classes of service.

In step 144, a round-robin scheduling scheme for BSS's 80 and client stations 70 is programmed in a level-1 scheduler 106 and a level-2 scheduler 108 based on a set of service parameters in a service table 90. The MAC module 100 determines the BSSID in the header of the input data in step 146.

The MAC module 100 determines whether the BSSID matches a BSSID of a video AP 62 in step 154. If true, a level-1 scheduler 106 determines whether BSS1 80-1 is currently scheduled for service in step 156 based on the round-robin scheduling scheme. If true, a level-2 scheduler 108 determines whether the client station 72 requesting service is currently scheduled for service in step 158 based on the round-robin scheduling scheme. If true, the video AP 62 services the client station 72 in step 160, and the method 140 returns to step 146. If any of the results in steps 154, 156, or 158 are false, the method 140 proceeds to step 162.

The MAC module 100 determines whether the BSSID matches a BSSID of an audio AP 64 in step 162. If true, a level-1 scheduler 106 determines whether BSS2 80-2 is currently scheduled for service in step 164 based on the round-robin scheduling scheme. If true, a level-2 scheduler 108 determines whether the client station 74 requesting service is currently scheduled for service in step 166 based on the round-robin scheduling scheme. If true, the audio AP 64 services the client station 74 in step 168, and the method 140 returns to step 146. If any of the results in steps 162, 164, or 166 are false, the method 140 proceeds to step 170.

The MAC module 100 determines whether the BSSID matches a BSSID of a data AP 66 in step 170. If true, a level-1 scheduler 106 determines whether BSS3 80-3 is currently scheduled for service in step 172 based on the round-robin scheduling scheme. If true, a level-2 scheduler 108 determines whether the client station 76 requesting service is currently scheduled for service in step 174 based on the round-robin scheduling scheme. If true, the data AP 66 services the client station 76 in step 176, and the method 140 returns to step 146. If any of the results in steps 170, 172, or 174 are false, the method 140 returns to step 146.

Figure 13A:
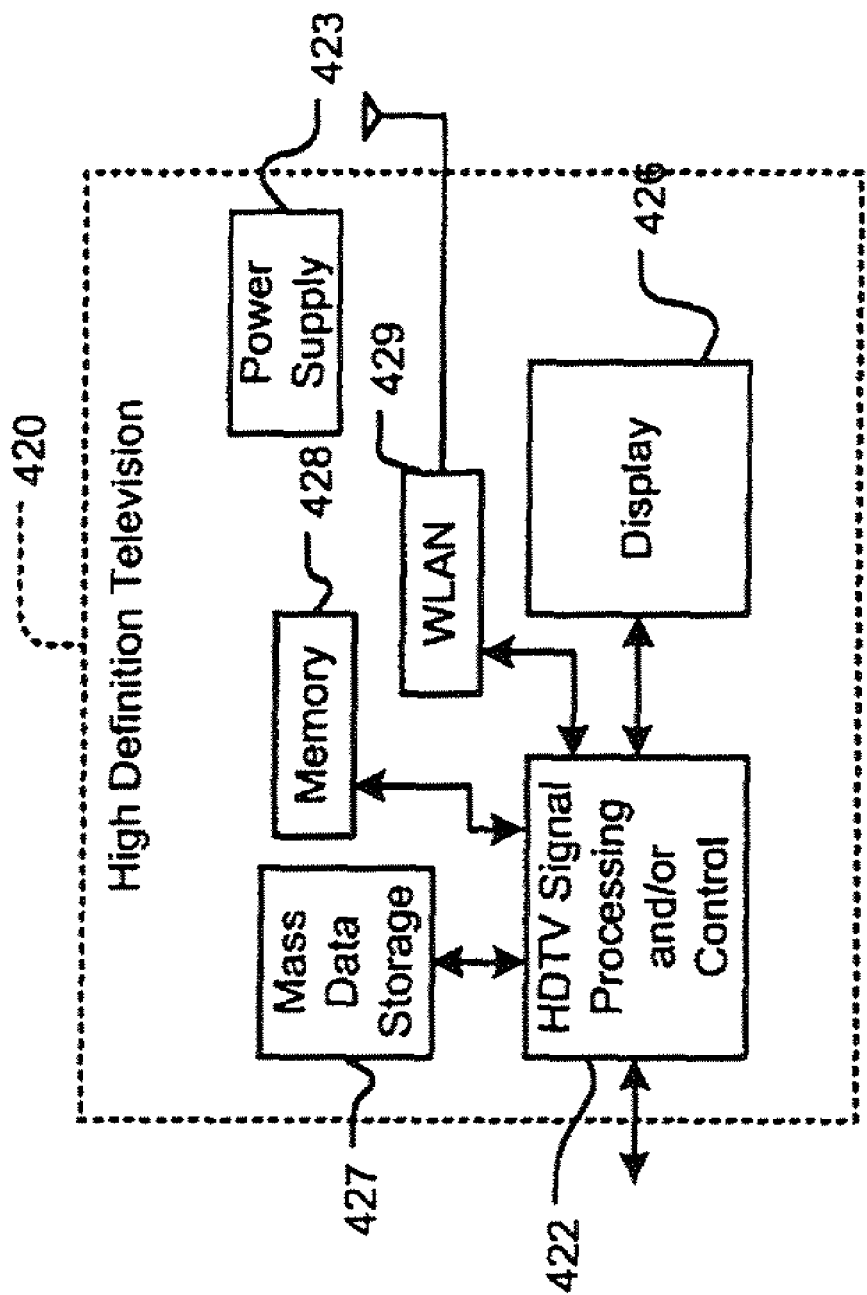
FIG. 13A is a functional block diagram of a high definition television.

Referring now to FIGS. 13A-13D, various exemplary implementations of the present invention are shown. Referring now to FIG. 13A, the present invention can be implemented in a high definition television (HDTV) 420. The HDTV 420 receives HDTV input signals in either a wired or wireless format and generates HDTV output signals for a display 426. In some implementations, signal processing circuit and/or control circuit 422 and/or other circuits (not shown) of the HDTV 420 may process data, perform coding and/or encryption, perform calculations, format data and/or perform any other type of HDTV processing that may be required.

The HDTV 420 may communicate with mass data storage 427 that stores data in a nonvolatile manner such as optical and/or magnetic storage devices. The HDD may be a mini HDD that includes one or more platters having a diameter that is smaller than approximately 1.8". The HDTV 420 may be connected to memory 428 such as RAM, ROM, low latency nonvolatile memory such as flash memory and/or other suitable electronic data storage. The HDTV 420 also may support connections with a WLAN via a WLAN network interface 429.

Figure 13B:
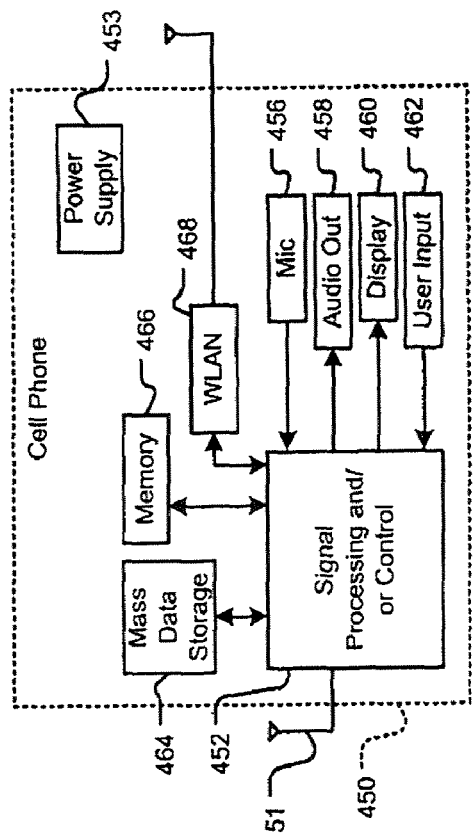
FIG. 13B is a functional block diagram of a cellular phone.

Referring now to FIG. 13B, the present invention can be implemented in a cellular phone 450 that may include a cellular antenna 451. In some implementations, the cellular phone 450 includes a microphone 456, an audio output 458 such as a speaker and/or audio output jack, a display 460 and/or an input device 462 such as a keypad, pointing device, voice actuation and/or other input device. The signal processing and/or control circuits 452 and/or other circuits (not shown) in the cellular phone 450 may process data, perform coding and/or encryption, perform calculations, format data and/or perform other cellular phone functions.

The cellular phone 450 may communicate with mass data storage 464 that stores data in a nonvolatile manner such as optical and/or magnetic storage devices for example hard disk drives HDD and/or DVDs. The HDD may be a mini HDD that includes one or more platters having a diameter that is smaller than approximately 1.8". The cellular phone 450 may be connected to memory 466 such as RAM, ROM, low latency nonvolatile memory such as flash memory and/or other suitable electronic data storage. The cellular phone 450 also may support connections with a WLAN via a WLAN network interface 468.

Figure 13C:
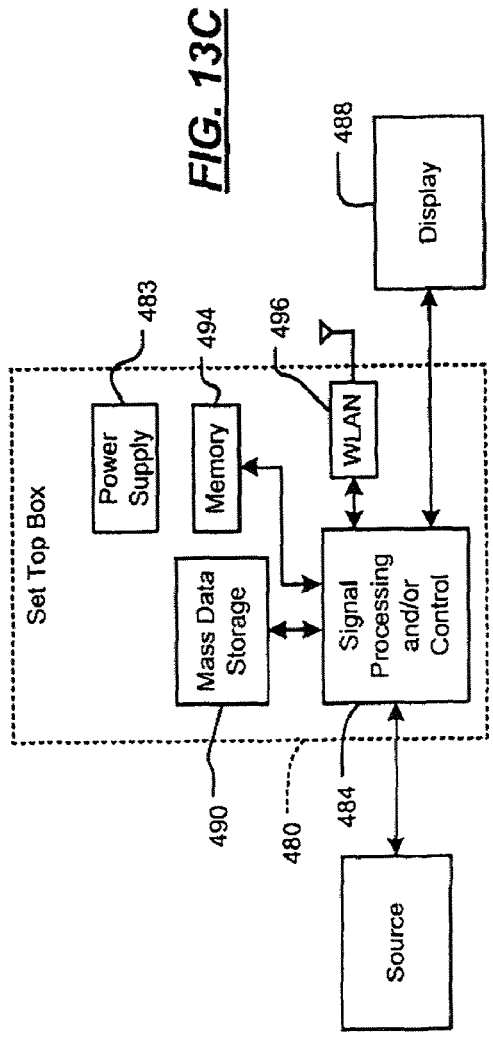
FIG. 13C is a functional block diagram of a set top box.

Referring now to FIG. 13C, the present invention can be implemented in a set top box 480. The set top box 480 receives signals from a source such as a broadband source and outputs standard and/or high definition audio/video signals suitable for a display 488 such as a television and/or monitor and/or other video and/or audio output devices. The signal processing and/or control circuits 484 and/or other circuits (not shown) of the set top box 480 may process data, perform coding and/or encryption, perform calculations, format data and/or perform any other set top box function.

The set top box 480 may communicate with mass data storage 490 that stores data in a nonvolatile manner. The mass data storage 490 may include optical and/or magnetic storage devices for example hard disk drives HDD and/or DVDs. The HDD may be a mini HDD that includes one or more platters having a diameter that is smaller than approximately 1.8". The set top box 480 may be connected to memory 494 such as RAM, ROM, low latency nonvolatile memory such as flash memory and/or other suitable electronic data storage. The set top box 480 also may support connections with a WLAN via a WLAN network interface 496.

Figure 13D:
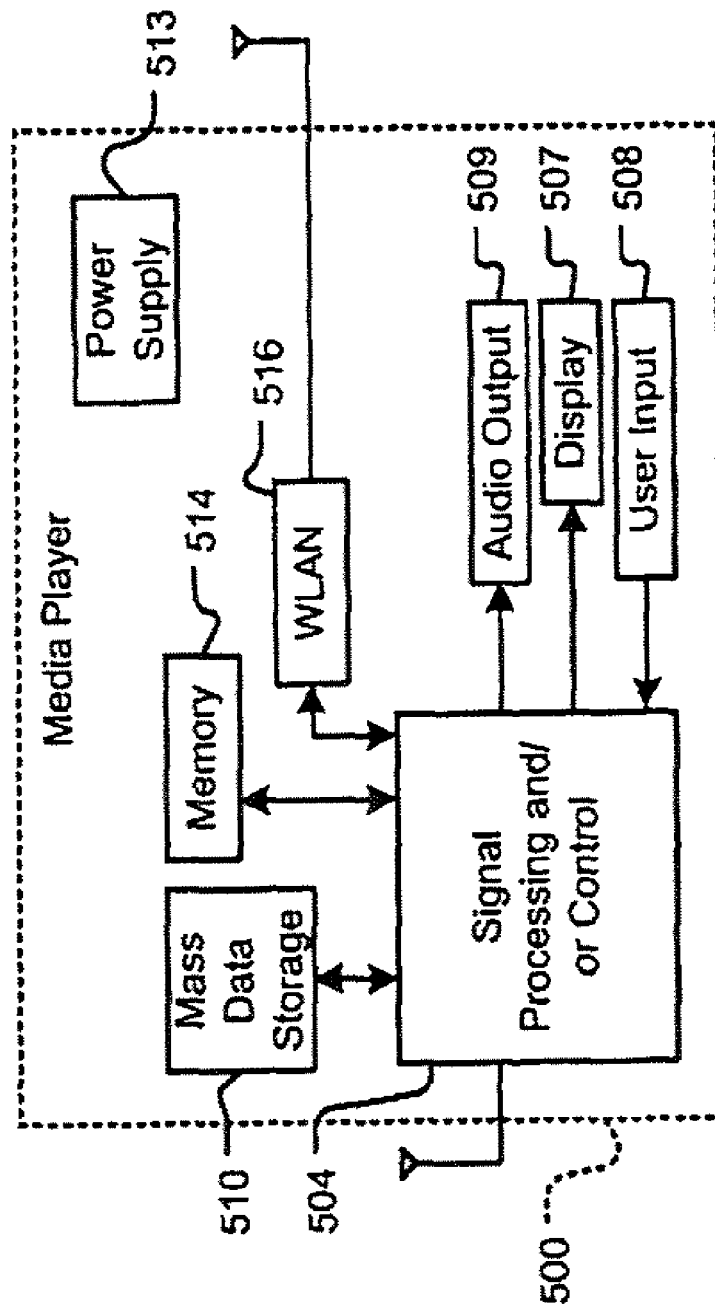
FIG. 13D is a functional block diagram of a media player.

Referring now to FIG. 13D, the present invention can be implemented in a media player 500. In some implementations, the media player 500 includes a display 507 and/or a user input 508 such as a keypad, touchpad and the like. In some implementations, the media player 500 may employ a graphical user interface (GUI) that typically employs menus, drop down menus, icons and/or a point-and-click interface via the display 507 and/or user input 508. The media player 500 further includes an audio output 509 such as a speaker and/or audio output jack. The signal processing and/or control circuits 504 and/or other circuits (not shown) of the media player 500 may process data, perform coding and/or encryption, perform calculations, format data and/or perform any other media player function.

The media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8". The media player 500 may be connected to memory 514 such as RAM, ROM, low latency nonvolatile memory such as flash memory and/or other suitable electronic data storage. The media player 500 also may support connections with a WLAN via a WLAN network interface 516. Still other implementations in addition to those described above are contemplated.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A system, comprising:
   a control module configured to define a plurality of basic service sets for an access point, wherein each of the basic service sets (i) corresponds to a class of service and (ii) has service parameters associated with the class of service; and
   a scheduling module configured to schedule (i) first transmit times for the basic service sets to transmit data from the access point to client stations and (ii) second transmit times for the client stations associated with the basic service sets to transmit data from the client stations to the access point,
   wherein the first transmit times and the second transmit times are based on the service parameters of the basic service sets.

2. The system of claim 1, wherein the scheduling module is configured to schedule the first transmit times and the second transmit times using a round-robin scheme.

3. The system of claim 1, wherein the service parameters for each of the basic service sets include two or more of:
   a service priority level for the class of service associated with each of the basic service sets,
   a number of data streams for each of the basic service sets, and
   unscheduled automatic power save delivery settings for each of the basic service sets.

4. The system of claim 1, wherein in response to the one of the client stations associating with one of the basic service sets, the scheduling module is configured to:
   provide a quality of service to one of the client stations without using a signaling mechanism between the access point and the one of the client stations, and
   provide the quality of service based on (i) the class of service used by the one of the client stations and (ii) the service parameters for the one of the basic service sets.

5. The system of claim 1, wherein in response to one of the client stations using (i) a first class of service and (ii) a second class of service, the control module is configured to:
   define (i) a first virtual client station and (ii) a second virtual client station for the one of the client stations,
   associate the first virtual client station with a first one of the basic service sets based on the service parameters for the first one of the basic service sets, and
   associate the second virtual client station with a second one of the basic service sets based on the service parameters for the second one of the basic service sets.

6. The system of claim 5, wherein the scheduling module is configured to:
   determine a first quality of service for the first virtual client station (i) based on the service parameters for the first one of the basic service sets and (ii) without using a signaling mechanism between the one of the client stations and the access point, and
   determine a second quality of service for the second virtual client station (i) based on the service parameters of the second one of the basic service sets and (ii) without using a signaling mechanism between the one of the client stations and the access point.

7. The system of claim 1, wherein the scheduling module is configured to:
   determine a quality of service for a data stream between one of the client stations and one of the basic service sets using the service parameters for the one of the basic service sets instead of using a signaling mechanism between the one of the client stations and the access point, and provide the quality of service to the one of the client stations without using the signaling mechanism in response to the one of the client stations associating with the one of the basic service sets.

8. The system of claim 1, wherein the control module is configured to control access of one of the client stations to one of the basic service sets by limiting a number of data streams for the one of the basic service sets based on the service parameters for the one of the basic service sets.

9. The system of claim 8, wherein the control module is configured to determine the number of data streams for the one of the basic service sets based on (i) a bandwidth of a network with which the access point communicates and (ii) a throughput rate of the class of service associated with the one of the basic service sets.

10. The system of claim 1, wherein in response to one of the client stations associating with one of the basic service sets, the scheduling module is configured to provide a quality of service to the one of the client stations without reconfiguring a network through which the one of the client stations associates the access point.

11. A method, comprising:
defining a plurality of basic service sets for an access point, wherein each of the basic service sets (i) corresponds to a class of service and (ii) has service parameters associated with the class of service;
scheduling first transmit times for the basic service sets to transmit data from the access point to client stations; and
scheduling second transmit times for the client stations associated with the basic service sets to transmit data from the client stations to the access point,
wherein the first transmit times and the second transmit times are based on the service parameters of the basic service sets.

12. The method of claim 11, wherein scheduling the first transmit times and the second transmit times comprises using a round-robin scheme.

13. The method of claim 11, wherein the service parameters for each of the basic sets include two or more of:
a service priority level for the class of service associated with each of the basic service sets,
a number of data streams for each of the basic service sets, and
unscheduled automatic power save delivery settings for each of the basic service sets.

14. The method of claim 11, further comprising, in response to the one of the client stations associating with one of the basic service sets:
providing a quality of service to one of the client stations without using signaling mechanism between the access point and the one of the client stations; and
providing the quality of service based on (i) the class of service used by the one of the client stations and (ii) the service parameters for the one of the basic service sets.

15. The method of claim 11, further comprising, in response to one of the client stations using (i) a first class of service and (ii) a second class of service:
defining (i) a first virtual client station and (ii) a second virtual client station for the one of the client stations;
associating the first virtual client station with a first one of the basic service sets based on the service parameters for the first one of the basic service sets; and
associating the second virtual client station with a second one of the basic service sets based on the service parameters for the second one of the basic service sets.

16. The method of claim 15 further comprising:
determining a first quality of service for the first virtual client station (i) based on the service parameters for the first one of the basic service sets and (ii) without using a signaling mechanism between the one of the client stations and the access point; and
determining a second quality of service for the second virtual client station (i) based on the service parameters of the second one of the basic service sets and without using a signaling mechanism between the one of the client stations and the access point.

17. The method of claim 11, further comprising:
determining a quality of service for a data stream between one of the client stations and one of the basic service sets using the service parameters for the one of the basic service sets instead of using a signaling mechanism between the one of the client stations and the access point; and
providing the quality of service to the one of the client stations without using the signaling mechanism in response to the one of the client stations associating with the one of the basic service sets.

18. The method of claim 11, further comprising controlling access of one of the client stations to one of the basic service sets by limiting a number of data streams for the one of the basic service sets based on the service parameters for the one of the basic service sets.

19. The method of claim 18, further comprising determining the number of data streams for the one of the basic service sets based on (i) a bandwidth of a network with which the access point communicates and (ii) a throughput rate of the class of service associated with the one of the basic service sets.

20. The method of claim 11, further comprising, in response to one of the client stations associating one of the basic service sets, providing a quality of service to the one of the client stations without reconfiguring a network through which the one of the client stations associates with the access point.

* * * * *